United States Patent Office 3,080,295
Patented Mar. 5, 1963

3,080,295
ODOR DESTROYING AGENT DERIVED FROM PYCNANTHEMUM ALBESCENS (LABIATAE)
John T. Goorley, Monroe, La., assignor to Standard Chemical Products, Inc., Hoboken, N.J., a corporation of New Jersey
No Drawing. Filed Mar. 17, 1961, Ser. No. 96,378
2 Claims. (Cl. 167—94)

The invention relates to a method of destroying odors, especially offensive or objectionable odors with volatile oils obtained from plants belonging to the genus Pycnanthemum (Labiatae). The invention also relates to novel compositions comprising said volatile oils which are useful as deodorants.

The essential or volatile oils derived from plants of the Pycnanthemum genus are not well known. Prior to applicant's invention, only the volatile oils from Pycnanthemum Incanum Michx, Pycnanthemum Lanceolatum Pursh, Pycnanthemum Muticum (Michx) Pers. and Pycnanthemum Pilsoum, Nutt had been known. There has been no known use for these oils although use as scents in toothpastes and powders and for the production of menthol have been suggested as possible uses (Guenther, The Essential Oils, vol. III, 1949, pp. 691–695).

It is an object of the invention to provide a novel method of destroying odors with volatile oils obtained from plants of the genus Pycnanthemum (Labiatae).

It is another object of the invention to provide novel compositions which are useful in destroying odors.

It is a further object of the invention to obtain a novel volatile oil from the plant *Pycnanthemum albescens*.

These and other objects and advantages of the invention will become obvious from the following description.

The volatile oils of the invention are obtained from the leaves and flowering tops of plants of the genus Pycnanthemum (Labiatae). The plants of the genus Pycnanthemum which are useful for obtaining the volatile oils of the invention are listed in Index Kewensis, Tome II, page 663. The preferred species of the genus is *Pycnanthemum albescens* which grows in abundance in north and central Louisiana and in other areas.

The volatile oils are obtained by distilling the leaves and flowering tops of the plants of the genus Pycnanthemum (Labiatae) with steam at 100° C. or higher, cooling and condensing the vapors to form a two-phase condensate consisting of water as one-phase and the desired volatile oil as the other phase and recovering the volatile oil. The amount of oil obtained is about 1% of the weight of the fresh plant but will vary between 0.5 to 1.5%, depending upon the age of the plant and the time between the harvesting and distillation of the plant. The volatile oil is used as such and is not fractionated into its individual components.

The method of destroying odors according to the invention comprises contacting the odorous principles with a composition comprised of volatile oil derived from plants of the genus Pycnanthemum (Labiatae) whereby the odor is destroyed. The preferred volatile oil is the oil derived from the plant species, *Pycnanthemum albescens*. The contacting may be performed by direct application of said volatile oil with the odorous substance or by contact with the odor in the atmosphere.

While it is not intended to limit the invention in any respects, the following theory is a possible explanation of the mechanism of the present invention. The literature on the physiological mechanism of odor sensations is quite scarce. Many of the commercial deodorants now available contain formaldehyde as the active agents and it is believed that the formaldehyde causes a temporary paralysis or blocking of the nasal odor receptors which results in a loss of nasal sensitivity rather than a destruction of the odorous principles. The compositions of the invention are not believed to act in this manner as there is no loss of nasal sensitivity immediately after smelling the oil.

It is believed that the volatile oil destroys the odorous principle by one of two mechanisms. The volatile oil may have a greater affinity for the nasal odor receptors or nerve ends than other odorous principles and thereby block the odor receptors from the sensation of odorous principles. This activity would be similar to the action of certain blocking drugs on the autonomous nerve systems.

The other possible mechanism is that the volatile oil forms complexes with the odorous principle which complexes are non-polar and, therefore, not able to activate the nasal odor receptors. This theory agrees with the concept that nerve conduction is initiated by a change in the electrical charge on nerve endings. The theory is further strengthened by the fact that most odor producing compounds are esters, alcohols, ketones, aldehydes and compounds containing other functional groups. These molecules are polar and can gain, lose or share electrons and are more important in odors than non-polar compounds. Therefore, if the volatile oil-odorous principle complex is non-polar, it would not affect the charge on the nerve endings and the odor would be destroyed without loss of nasal sensitivity. The proposed theory is not intended to limit the invention.

The compositions of the invention are comprised of the volatile oil derived from a plant of the genus Pycnanthemum (Libiatae), alone or in admixture with a carrier. The use of the desired compositions will determine the carrier, if any. For example, pure volatile oil of the invention can be added to paper pulp to destroy the mercaptan-like odors emanating from paper mills and no carrier is required.

If the oil is to destroy perspiration odors, the volatile oil may be added to cosmetics in the form of creams, lotions or sprays. To destroy mouth odors from tobacco, onions or garlic, the volatile oil may be added to mouth washes or throat sprays.

To deodorize enclosed areas such as pathology laboratories, chemical laboratories or kitchens, the oil can be dispensed with an aerosol bomb having the usual carriers such as Freon. To remove odors from containers, floors and the like, an aqueous suspension of the volatile oil can be used.

The compositions and the method of the application are effective against any odor. Formaldehyde odors in pathology laboratories or classrooms, mercaptan odors enamating from paper mills and adduct rubbers, hydrogen sulfide odors, tobacco smoke odors, onion and garlic odors and the odor from decaying animals, ammonia odors, perspiration odors and animal odors are just a few examples of the many odors which are destroyed by the method.

In addition to being effective in destroying odors, the compositions of the invention also possess antiseptic properties. In solution the phenol coefficient of the volatile oil derived from *Pycnanthemum albescens* is about 10 and is much greater in the vapor phase. The compositions are also useful for relieving or preventing allergy, asthma and hay fever when diffused in the air of the room occupied by persons affected by these conditions.

In the following examples there are described several preferred embodiments to illustrate the invention. However, it should be understood that the invention is not intended to be limited to the specific embodiments.

*Example I*

Ten kilograms of the leaves and flowering tops of the plant *Pycnanthemum albescens* were placed in a wire basket inside a barrel with a top. Steam at 100° C. was passed into the barrel through an inlet at the bottom of the barrel. The steam rose to the top of the barrel through the plant material and then was removed and condensed and collected.

The condensate was a two-phase liquid consisting of 100 ml. of a volatile oil in the upper layer and 10 liters of water in the lower layer. The oil was separated from the water and was a yield of 1.0% by weight of the plant material.

The volatile oil was insoluble in water and very soluble in ethyl alcohol, ethyl ether, petroleum benzin, and most organic solvents. The oil consisted mostly of terpenes and was low in oxygenated derivatives as seen from the analysis below:

| | |
|---|---|
| Phenols | Nil. |
| Aldehydes | Nil. |
| Ketones | Nil. |
| Esters | Ester No. 7.79. |
| Alcohols | 134.1 mg. of KOH required to saponify 1 gm. of acetylated oil. |

The volatile oil had the following physical properties:

| | |
|---|---|
| Boiling point | 150 to 250° C. at atmospheric pressure. |
| Specific gravity | 0.8500 to 0.995. |
| Optical rotation | −22.0 to −23.2°. |
| Refraction index | 1.473 to 1.57. |
| Color | Colorless. |
| Odor | Mint-like. |

The oil was used to prepare the compositions of the following examples.

Example II

A satisfactory hand cream was prepared by mixing the following ingredients into a homogeneous mixture:

| | | |
|---|---|---|
| Stearic acid | gm | 200 |
| Cetyl alcohol | gm | 10 |
| Deltyl¹ (Givaudan) | gm | 30 |
| Tris-amino (Commercial Solvents) | gm | 10 |
| Glycerin | gm | 150 |
| Water | gm | 600 |
| Oil *Pycnanthemum albescens* | ml | 1 to 2 |

¹ Deltyl is isopropyl myristate.

Example III

A hand lotion was formed by blending the following constituents:

| | | |
|---|---|---|
| Diethylene glycol monostearate | gm | 1.0 |
| Stearic acid | gm | 2.0 |
| Isopropyl myristate | gm | 3.0 |
| Cetyl alcohol | gm | 0.5 |
| Lanolin | gm | 0.5 |
| Triethanolamine | gm | 1.0 |
| Allantoin | gm | 0.2 |
| Water | gm | 89.0 |
| Triethanolamine lauryl sulfate | gm | 0.5 |
| Oil *Pycnanthemum albescens* | ml | 0.5 |

Example IV

A desirable sun tan cream was prepared by mixing the following ingredients together:

| | | |
|---|---|---|
| Giv-Tan F (2-ethoxyethyl p-methoxy cinnamate by Sindar Corp.) | gm | 1.5 |
| Stearic acid | gm | 20.0 |
| Isopropyl myristate | gm | 3.0 |
| Cetyl alcohol | gm | 1.0 |
| Tris-amine | gm | 1.0 |
| Propylene glycol | gm | 10.0 |
| Water | gm | 63.0 |
| Oil *Pycnanthemum albescens* | ml | 0.5 |

Example V

A transparent semi-solid skin astringent was prepared by thorough blending of the following components:

| | | |
|---|---|---|
| Alcohol | ml | 45.0 |
| Tween 20 (polyoxyethylene sorbitan monoleate by Atlas) | gm | 2.0 |
| Glycerin | gm | 2.0 |
| Allantoin | gm | 0.2 |
| Water | gm | 44.0 |
| Carbowax No. 1500 (Carbide & Carbon) | gm | 5.0 |
| Carbopol No. 940 | gm | 0.75 |
| 30% sol. of monoisopropanolamine | gm | 0.75 |
| Oil *Pycnanthemum albescens* | ml | 0.5 |

Example VI

A dust mop spray useful in deodorizing rooms and maintaining the polished finish of furniture and wooden floors is comprised of the following mixture:

| | Parts |
|---|---|
| Chloroethane | 20.0 |
| White mineral oil | 2.0 |
| Oil of *Pycnanthemum albescens* | 0.2 to 2.0 |
| Isopropyl alcohol | 4.8 to 3.0 |
| Silicone oil (Dow Corning 2000) | 0.5 |
| Propellent | 72.5 |

Example VII

Another dust mop spray composition is comprised of

| | Parts |
|---|---|
| Silicone emulsion | 5.0 |
| Oil of *Pycnanthemum albescens* | 1.0 |
| Deionized water | 86.0 |
| Propellent | 8.0 |

Example VIII

A spray useful for deodorizing garbage cans is comprised of

| | Parts |
|---|---|
| Mineral spirits | 38.0 |
| Chlorbisan | 0.125 |
| 2,2-bis (p-methoxy-phenyl)-1,1,1-trichloroethane | 1.5 |
| Oil of *Pycnanthemum albescens* | 0.375 |
| Propellent | 60.0 |

Example IX

An aerosol protection hand cream of the invention is prepared from

| | Parts |
|---|---|
| Myristic acid | 10.0 |
| Stearic acid | 40.0 |
| Cetyl alcohol | 3.3 |
| Modified lanolin | 3.3 |
| Isopropyl myristate | 11.7 |
| Triethanolamine | 11.7 |
| Silicone oil (Dow Corning 555) | 20.0 |
| Glycerol | 15.0 |
| Polyvinyl pyrrolidine (PVP) | 1.7 |
| Oil of *Pycnanthemum albescens* | 5.0 |
| Propellent | 111.0 |

The propellent used in the above examples was comprised of 40% dichlorofluoromethane and 60% dichlorotetrafluoroethane. Other propellents may be used however.

Various modifications of the method and compositions of the invention may be made without departing from the spirit or scope thereof and it is to be understood that the invention be limited only as defined in the appended claims.

I claim:

1. An odor destroying composition containing as its principal odor destroying ingredient the volatile oil obtained by steam distillation of the leaves and flowering tops of the plant species, *Pycnanthemum albescens* (Labiatae).

2. A method for destroying odors which comprises contacting the odorous principle with the volatile oil obtained by the steam distillation of the leaves and flowering tops of the plant species, *Pycnanthemum albescens* (Labiatae) whereby the odor is destroyed.

References Cited in the file of this patent

Hocking: A Dictionary of Terms in Pharmacognosy, Thomas Co., 1960, page 184.
Chem. Abst. I, vol. 33, 1939, page 6526 (1).
Chem. Abst. II, vol. 36, 1942, page 3003 (5).
Chem. Abst. III, vol. 25, 1931, page 4662 (4).
Chem. Abst. IV, vol. 12, 1918, page 1410 (2).
Gray's Manual of Botany, American Book Co., 1952, pages 1241–1245.